United States Patent
Cho et al.

(10) Patent No.: US 7,664,390 B2
(45) Date of Patent: Feb. 16, 2010

(54) CAMERA MODULE PACKAGE

(75) Inventors: Jae Sub Cho, Suwon (KR); Jung Jin Kim, Hwaseong (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 403 days.

(21) Appl. No.: 11/606,342

(22) Filed: Nov. 30, 2006

(65) Prior Publication Data

US 2007/0217786 A1 Sep. 20, 2007

(30) Foreign Application Priority Data

Mar. 15, 2006 (KR) .................. 10-2006-0024116

(51) Int. Cl.
*G03B 17/00* (2006.01)
*H04N 5/225* (2006.01)

(52) U.S. Cl. .................. 396/542; 396/529; 396/541; 348/340; 348/374

(58) Field of Classification Search ............... 396/535, 396/541–542, 268, 529; 348/373–374, 340
See application file for complete search history.

(56) References Cited

U.S. PATENT DOCUMENTS

| | | | | | |
|---|---|---|---|---|---|
| 6,734,419 | B1 * | 5/2004 | Glenn et al. | ............. | 250/239 |
| 7,084,512 | B2 * | 8/2006 | Higashida et al. | ............. | 257/777 |
| 7,182,529 | B2 * | 2/2007 | Kurosawa | ............. | 396/358 |
| 7,294,828 | B2 * | 11/2007 | Kinoshita et al. | ............. | 250/239 |
| 7,388,616 | B2 * | 6/2008 | Yamazaki | ............. | 348/373 |
| 7,422,382 | B2 * | 9/2008 | Seo | ............. | 396/529 |
| 7,554,599 | B2 * | 6/2009 | Tu et al. | ............. | 348/340 |
| 2001/0050717 | A1 * | 12/2001 | Yamada et al. | ............. | 348/340 |
| 2001/0050721 | A1 * | 12/2001 | Miyake | ............. | 348/374 |
| 2003/0071342 | A1 * | 4/2003 | Honda et al. | ............. | 257/687 |
| 2004/0222352 | A1 * | 11/2004 | Nishizawa | ............. | 250/208.1 |
| 2004/0223072 | A1 * | 11/2004 | Maeda et al. | ............. | 348/340 |
| 2005/0184372 | A1 * | 8/2005 | Asahi et al. | ............. | 257/678 |
| 2005/0212947 | A1 * | 9/2005 | Sato et al. | ............. | 348/340 |
| 2005/0219399 | A1 * | 10/2005 | Sato et al. | ............. | 348/340 |
| 2005/0258502 | A1 * | 11/2005 | Kong et al. | ............. | 257/433 |
| 2006/0082658 | A1 * | 4/2006 | Lee et al. | ............. | 348/208.7 |
| 2006/0202318 | A1 * | 9/2006 | Satou et al. | ............. | 257/686 |
| 2006/0234767 | A1 | 10/2006 | Nishikawa et al. | | |
| 2006/0243884 | A1 * | 11/2006 | Onodera et al. | ............. | 250/208.1 |
| 2007/0054419 | A1 * | 3/2007 | Paik et al. | ............. | 438/1 |

(Continued)

FOREIGN PATENT DOCUMENTS

EP  1 081 944  3/2001

(Continued)

OTHER PUBLICATIONS

Japanese Office Action issued on Apr. 7, 2009 in corresponding Japanese Patent Application 2006-318341.

*Primary Examiner*—W. B. Perkey
*Assistant Examiner*—Dennis Hancock

(57) ABSTRACT

A camera module package comprises a housing having a lens section mounted therein; a circuit board having a window through which light transmitted through the lens section of the housing passes; an image sensor that is flip-chip bonded to a lower surface of the circuit board; and an impact absorbing member attached to an upper surface of the circuit board, of which the side surface serves as a coupling guide which is coupled to an inner periphery of the housing.

16 Claims, 6 Drawing Sheets

U.S. PATENT DOCUMENTS

2007/0096265 A1 * 5/2007 Wallace ................. 257/666

FOREIGN PATENT DOCUMENTS

| JP | 2-118366 | 9/1990 |
| JP | 2001-108878 | 4/2001 |
| KR | 10-2006-0003887 | 1/2006 |
| WO | WO 2004/095832 | 11/2004 |

* cited by examiner

[FIG. 1]
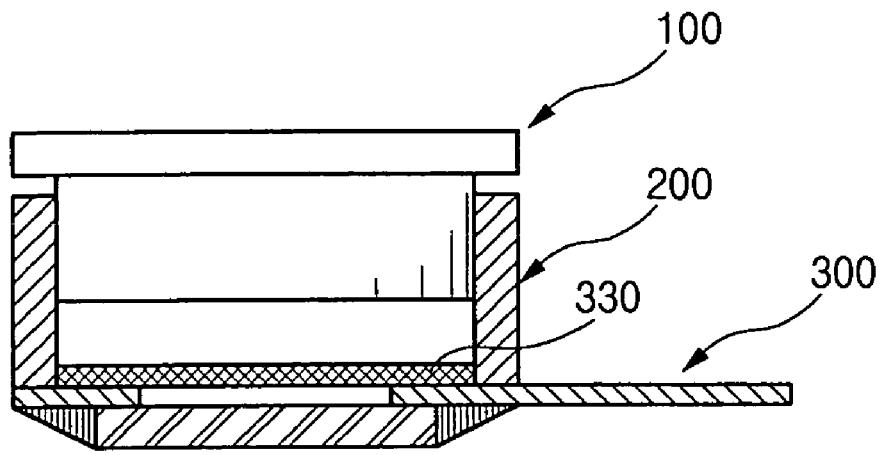
[FIG. 2]
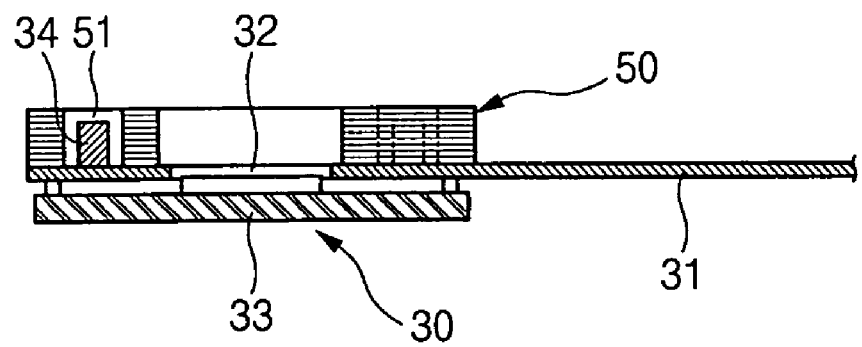
[FIG. 3A]
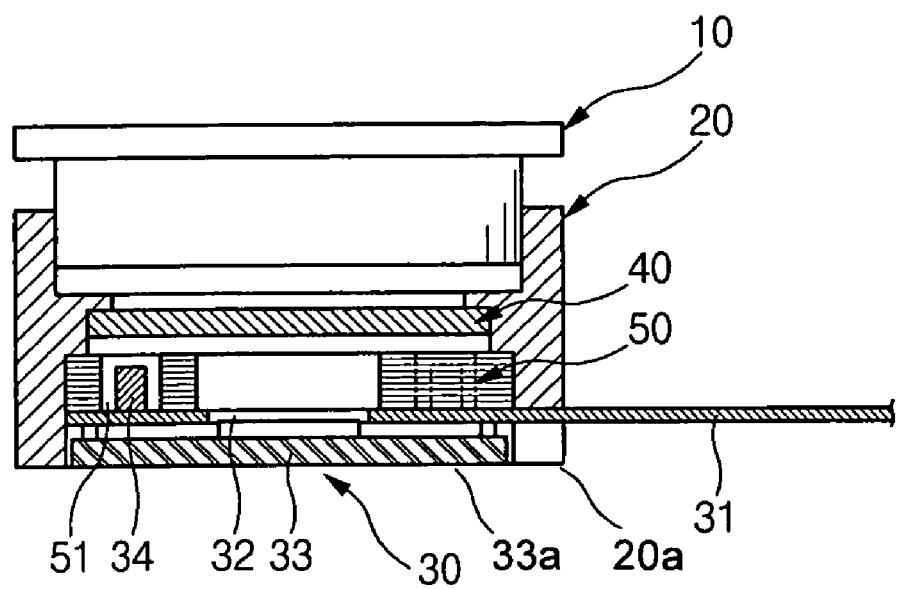

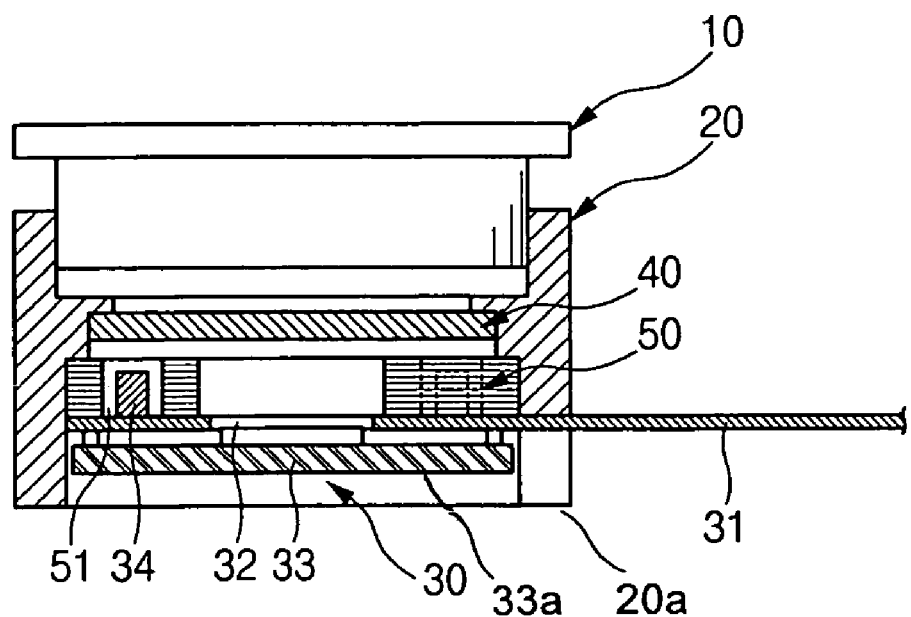
[FIG. 3B]

[FIG. 4]
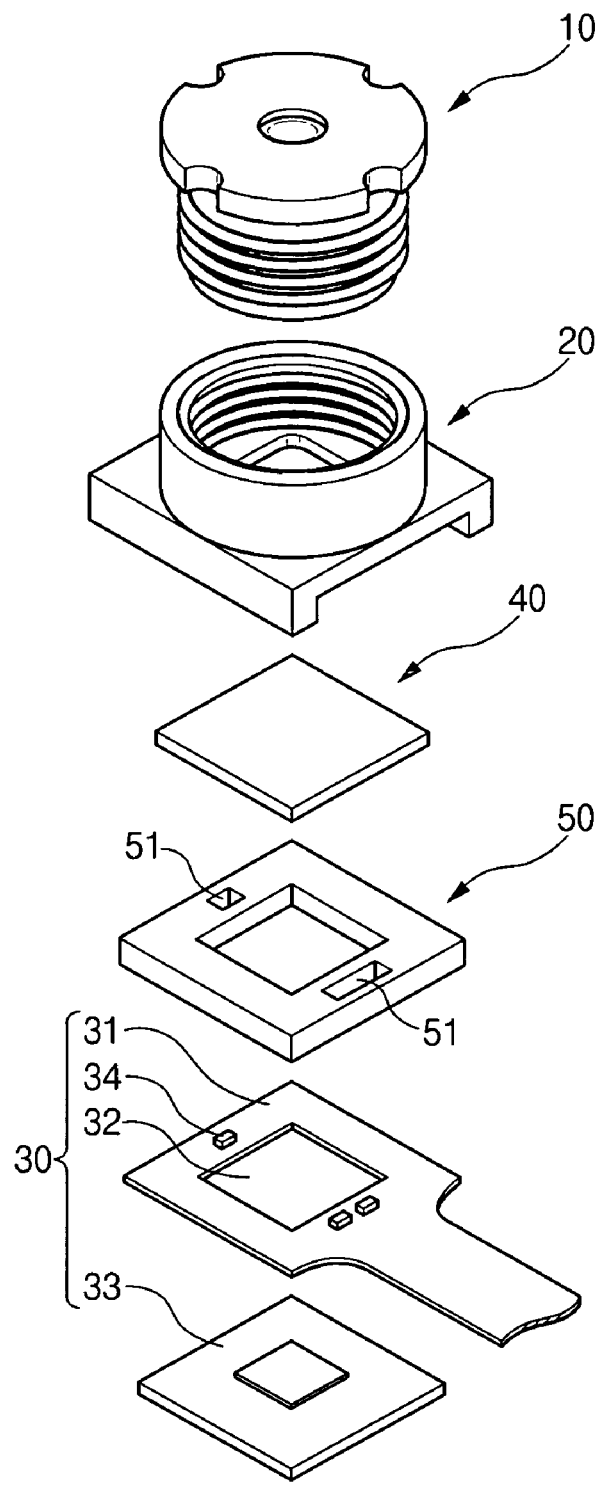

[FIG. 5A]
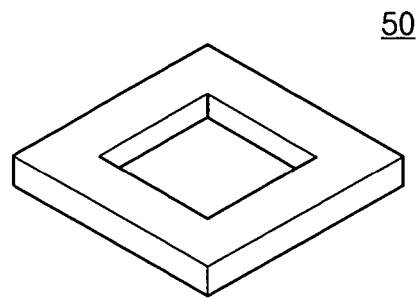
[FIG. 5B]
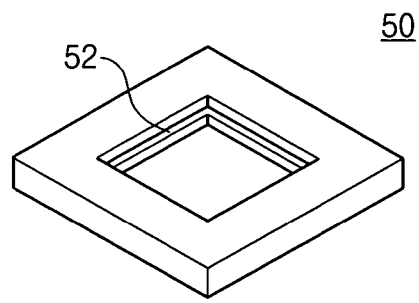
[FIG. 5C]
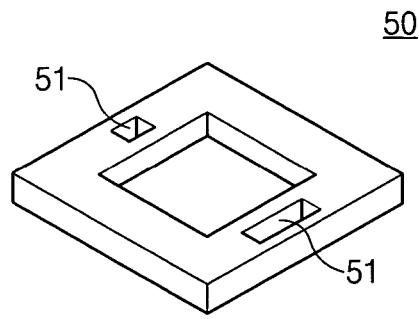
[FIG. 6A]
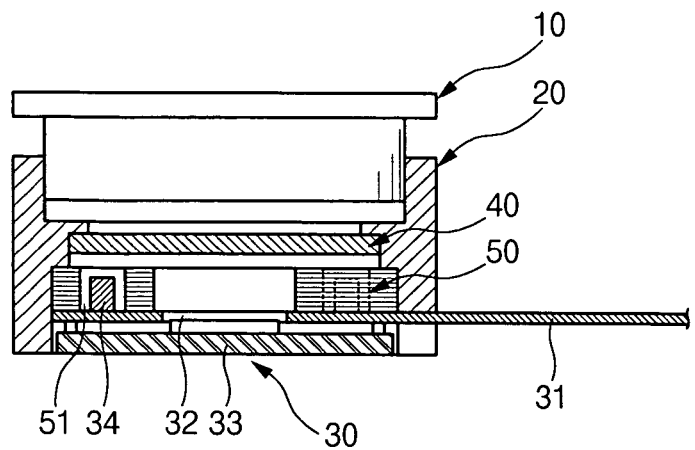

[FIG. 6B]
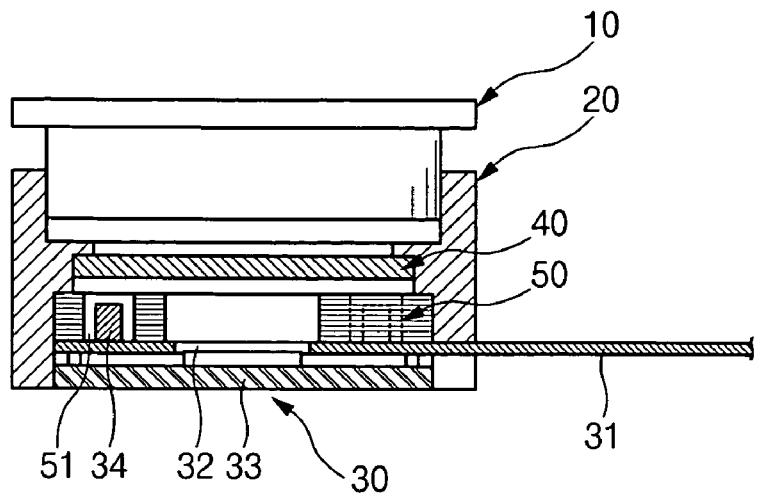
[FIG. 7A]
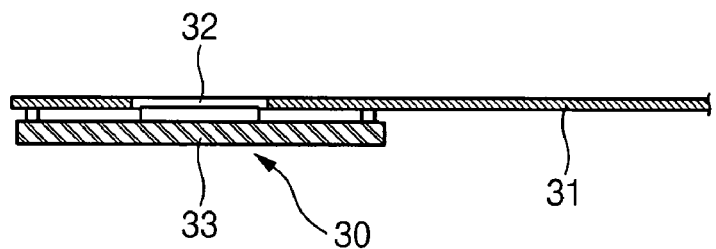
[FIG. 7B]
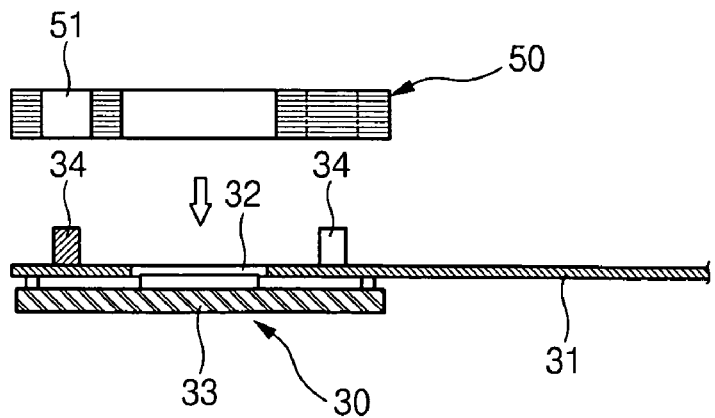

[FIG. 7C]
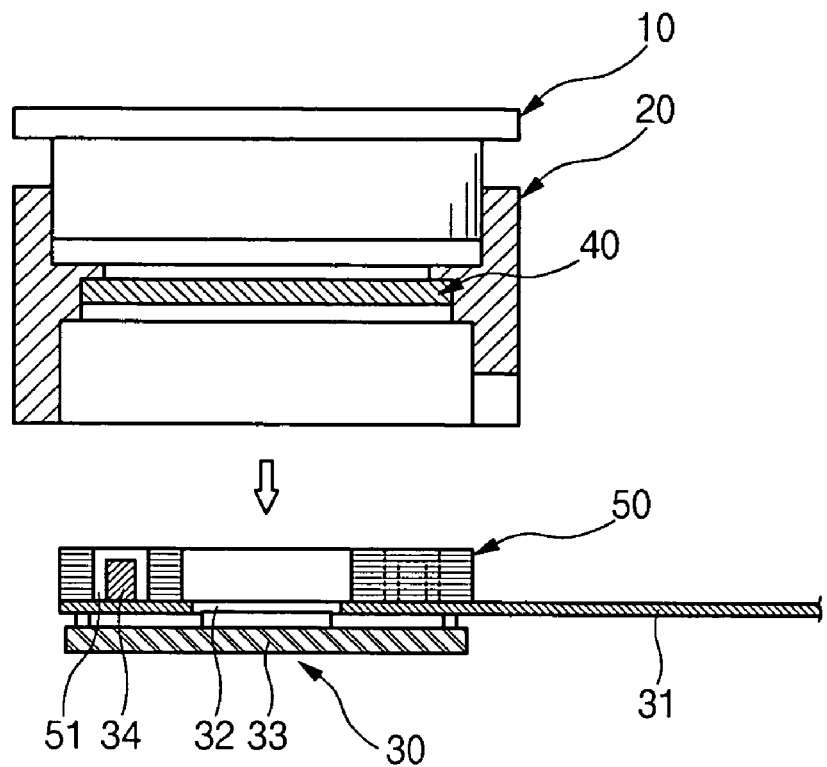
[FIG. 7D]
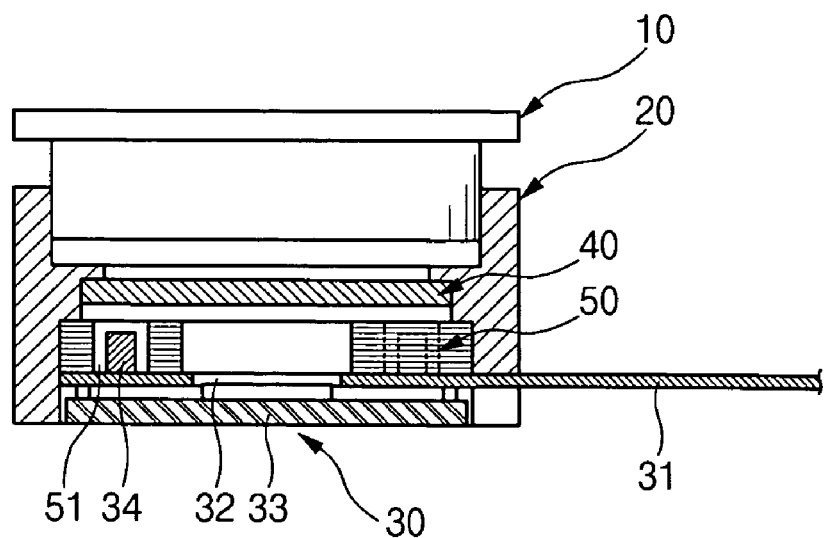

CAMERA MODULE PACKAGE

CROSS-REFERENCE TO RELATED APPLICATIONS

This application claims the benefit of Korean Patent Application No. 2006-24116 filed with the Korea Industrial Property Office on Mar. 15, 2006, the disclosure of which is incorporated herein by reference.

BACKGROUND OF THE INVENTION

1. Field of the Invention

The present invention relates to a camera module package including an image sensor module which is used in digital cameras, mobile equipments or various monitoring devices, and more specifically, to an ultra-small-sized camera module package which can obtain an excellent result at a falling test even when an ultra-slim image sensor is used.

2. Description of the Related Art

As the information communication technology rapidly develops, data communication speed is improved, and an amount of data communication is expanded. Further, an imaging device such as a CCD image sensor or CMOS image sensor is mounted on mobile electronic equipments such as mobile phones or notebooks, and thus image data as well as text data can be transmitted in real-time, the image data being taken by a camera module.

Recently, as mobile terminals tend to be miniaturized, it is urgently required to reduce the size of each part. Based on that, the mobile communication technology and the technique for electrical parts have been continuously developed. Particularly, as mobile phones having cameras mounted thereon tends to be reduced in size and thinned, a camera module package is also required to be reduced in size and thinned.

Elements determining the height of such a camera module package include a height from the upper surface of an image sensor to the upper surface of a lens and a thickness from the upper surface of the image sensor to the lower surface of an image sensor module. The height from the upper surface of the image sensor to the upper surface of the lens is determined by an applied sensor and lens design, and the thickness from the upper surface of the image sensor to the lower surface of the image sensor module is largely determined by a packaging method applied at the time of an assembling process.

As a method of packaging an image sensor for camera, there are provided a flip-chip COF (Chip On Film) method, a wire-bonding COB (Chip On Board) method, and a CSP (Chip Scale Package) method, among which the COF method and the COB method are widely used.

The COB method is a similar process to that of an existing semiconductor production line and has higher productivity than other packaging methods. However, since wire should be used for the connection with a PCB, the size of the entire module increases and an additional process is needed. Further, the thickness of the wire-bonded PCB is included in the thickness of an image sensor corresponding to the height from the upper surface of the image sensor to the lower surface thereof. Therefore, it is unfavorable in terms of the height of the image sensor module.

In the COF method, a space for attaching wire is not needed. Therefore, the area of a package and the height of a lens barrel can be reduced. Further, since a thin film or flexible printed circuit board (FPCB) is used in the COF method, a reliable package which endures an external impact can be manufactured and the process thereof is relatively simplified.

Moreover, the COF method satisfies such a tendency that signals are processed at high speed, high density is required, and multiple pins are needed.

Hereinafter, a conventional camera module package manufactured by using the COF method will be described, and the problems thereof will be examined.

FIG. 1 is a front view of a camera module according to the COF packaging method.

In the COF packaging method, an image sensor is attached on one surface (lower surface) of an FPCB 300 provided with a window through which light transmitted through a lens section can pass, as shown in FIG. 1. Then, an IR filter 330 processed to have a predetermined size is attached on the surface (upper surface) opposite to the lower surface of the FPCB 330 on which the image sensor 320 is attached. After that, coupling and bonding is performed so that the outer periphery of the IR filter 330 attached to the FPCB 300 is closely attached to the inner periphery of a lower opening of the housing 200 including the lens section 100, with the outer periphery being set to a guide surface.

In general, the thickness of an image sensor used in such a COF packaging method is about 675 µm. Recently, as a semiconductor technology develops, an ultra-slim image sensor having a height of about 200 µm is used. However, when the thickness of an image sensor is drastically reduced in order to make an image sensor module ultra-slim, a chip can be damaged by stress which is applied to the image sensor at reliability evaluation such as a falling test.

In relation to the durability of a camera module package, Japanese Unexamined Patent Application Publication No. 2001-128072 and Korean Laid-Open Patent Publication No. 2003-003887 have disclosed that, when an image sensor is flip-chip bonded to an FPCB, a reinforcing member is bonded to the FPCB by an adhesive or the like so as to secure the strength of the board.

In such a technique for securing the strength of the board itself, however, the flip-chip bonded image sensor is directly exposed outside. Therefore, reliability problems such as damage of a chip still remain.

Further, in a conventional COF packing method, such elements as multilayer ceramic capacitors (MLCC) cannot be mounted so as to be positioned inside the housing of the camera module because of the IR filter attached to the FPCB, but are inevitably mounted so as to be positioned on the same surface as the surface, on which the image sensor is attached, or outside the housing. As a result, the required FPCB increases in size, thereby increasing the size of the entire image sensor module.

SUMMARY OF THE INVENTION

An advantage of the present invention is that it provides a camera module package which can prevent such reliability defects that a chip is damaged by stress applied to an image sensor at reliability evaluation such as a falling test even when the thickness of the image sensor is reduced by decreasing the height of an image sensor module.

Additional aspect and advantages of the present general inventive concept will be set forth in part in the description which follows and, in part, will be obvious from the description, or may be learned by practice of the general inventive concept.

According to an aspect of the invention, a camera module package comprises a housing having a lens section mounted therein; a circuit board having a window through which light transmitted through the lens section of the housing passes; an image sensor that is flip-chip bonded to a lower surface of the circuit board; and an impact absorbing member attached to an upper surface of the circuit board, of which the side surface serves as a coupling guide which is coupled to an inner periphery of the housing. Since the side surface of the impact absorbing member is coupled to the inner periphery of the housing such that they form a connecting interface, the impact absorbing member directly absorbs or buffers an external impact occurring at a falling test or the like, thereby protecting the ultra-slim image sensor.

According to another aspect of the invention, the outer circumference of the impact absorbing member is larger than that of the image sensor. In this case, the image sensor does not come in contact with the housing, when the image sensor is coupled to the housing. Therefore, an external impact is prevented from being transmitted to the image sensor.

According to a further aspect of the invention, a sealing material is filled between the housing and the image sensor bonded to the circuit board, which makes it possible to protect the light receiving surface of the image sensor from the external environment.

According to a still further aspect of the invention, the outer circumference of the impact absorbing member has the same size as that of the image sensor. Therefore, an image sensor module can be manufactured to have a size corresponding to the size of the image sensor, which makes it possible to manufacture a chip-scale sized package. Further, the outer periphery of the image sensor serves as a coupling guide so as to prevent tilting or rotating of an optical axis which occurs at the time of packaging.

According to a still further aspect of the invention, the bottom surface of the housing and the bottom surface of the image sensor bonded to the circuit board are formed at the same level. Accordingly, the side portion of the image sensor can be protected, and the height of the entire package can be reduced.

According to a still further aspect of the invention, the bottom surface of the housing is formed to project downward more than the bottom surface of the image sensor bonded to the circuit board. Accordingly, an impact is prevented from being directly applied to the image sensor at a falling test.

According to a still further aspect of the invention, the camera module package further comprises an IR-cut filter formed to have a size and shape corresponding to the window, the IR-cut filter being attached on the upper surface of the circuit board, or an IR-cut filter attached on the upper surface of the impact absorbing member. In this case, the IR-cut filter does not serve as a coupling guide any more. Therefore, a degree of freedom in design of the filter disposition increases.

According to a still further aspect of the invention, a cavity is formed on the upper surface of the impact absorbing member so as to receive the IR-cut filter, and the impact absorbing member is attached in the cavity. The cavity is formed so as to secure a lens focal distance for a high-pixel mobile terminal which is recently developed.

According to a still further aspect of the invention, the circuit board is a double-sided FPCB, a passive element is mounted on an upper surface of the double-side FPCB, and the impact absorbing member has a space formed to correspond to the position of the passive element. Accordingly, reliability can be enhanced by absorbing an impact, and simultaneously, various electrical parts can be mounted on the surface facing the inside of the housing of the FPCB, thereby reducing the size of the circuit board.

According to a still further aspect of the invention, the impact absorbing member is formed of ceramic materials. Since the impact absorbing member is manufactured by a dicing process, precision errors or burs can be prevented from occurring, compared with when the impact absorbing member is formed of synthetic resin or metal.

According to a still further aspect of the invention, the impact absorbing member is formed of synthetic resin. In this case, the board and the housing bonded to each other are formed of the same material, thereby strengthening a bonding force.

According to a still further aspect of the invention, the impact absorbing member is formed of metallic materials. The impact absorbing member can serve as a heat sink and has an excellent strength.

According to a still further aspect of the invention, the outer periphery of the impact absorbing member is formed to have a shape and size corresponding to the inner periphery of a lower opening of the housing, in order to serve as a coupling guide when the impact absorbing member is coupled to the housing. Accordingly, the bonding between the image sensor module and the housing can be achieved more securely.

According to a still further aspect of the invention, the image sensor has a thickness of less than 200 μm. Then, it is possible to reduce the height of the entire camera module.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 1 is a front view illustrating a camera module according to a conventional COF packaging method;

FIG. 2 is a front view illustrating an image sensor module according to the present invention;

FIGS. 3A and 3B are front views illustrating a camera module package including the image sensor module;

FIG. 4 is an exploded perspective view illustrating the camera module package according to the invention;

FIGS. 5A to 5C are diagrams illustrating various shapes of an impact absorbing member;

FIGS. 6A and 6B are diagrams illustrating various examples depending on a relative size of the impact absorbing member; and FIGS. 7A to 7D are sectional views illustrating a process of manufacturing the camera module package according to the invention.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

Hereinafter, a preferred embodiment of the present invention will be described in detail with reference to the accompanying drawings.

Camera Module Package

FIG. 2 is a front view illustrating an image sensor module according to the invention, FIGS. 3A and 3B are front views illustrating a camera module package including the image sensor module, FIG. 4 is an exploded perspective view illustrating the camera module package according to the invention, FIGS. 5A to 5C are diagrams illustrating various examples of an impact absorbing member, and FIGS. 6A and 6B are diagram illustrating various examples depending on a relative size of the impact absorbing member.

In the camera module package according to the invention, a plurality of lenses may be directly mounted inside a housing (integration type), or a lens barrel having a plurality of lenses mounted therein may be coupled to a housing (separation type). For convenience of explanation, the separation-type camera module package will be described with reference to FIGS. 3 and 4.

The lens barrel 10 serves as a lens holder and is typically formed of resin such as polycarbonate. The lens barrel 10 has an aperture and a condensing lens installed in a bottom side which is inserted into the housing 20. The aperture defines a path of light passing through the condensing lens, and the condensing lens causes light to be received in a light receiving section of an image sensor to be described below. Further, IR-coated glass may be attached on the upper surface of the lens barrel 10.

The housing 20 has upper and lower openings formed. The upper opening is coupled to the lens barrel 10, and the lower opening is coupled to a combined body of a fixing bracket 50 and an image sensor module 30. Further, an IR cut filter may be mounted inside the housing 20. Alternately, the IR cut filter may be attached on a circuit board of the image sensor module or on an impact absorbing member 50.

The bottom surface of the housing 20a is formed at the same level as the bottom surface of the image sensor 33a bonded to a circuit board, as shown in FIG. 3A. Alternately, the bottom surface of the housing may be formed to project downward more than the bottom surface of the image sensor bonded to the circuit board, as shown in FIG. 3B.

As shown in FIG. 3A, when the bottom surface of the housing 20a and the bottom 33a surface of the image sensor are formed at the same level, the side portion of the image sensor can be protected, and the height of the entire package can be reduced.

Further, as shown in FIG. 3B, when the bottom surface of the housing 20a is formed to project downward more than the bottom surface of the image sensor 33a, a direct impact can be prevented from being applied to the image sensor at the time of a falling test.

The image sensor module 30 is coupled to the lower opening of the housing 20. As shown in FIG. 2, the image sensor module 30 includes an FPCB 31 provided with a window 32 through which light transmitted through a lens section can pass, an image sensor 33 which is attached to the FPCB 31 so as to receive and process the light passing through the window 32, and the impact absorbing member 50 attached on the surface (upper surface) opposite to the FPCB surface (lower surface) on which the image sensor is attached. Meanwhile, one end of the FPCB 31 is connected to a connector (not shown).

As for the FPCB 31, a resin board such as polyimide having flexibility can be used. When a double-sided FPCB is used as the FPCB 31, at least one or more electric parts 34 can be mounted on the surface (upper surface) opposite to one surface (lower surface) of the FPCB 31 on which the image sensor 33 is attached. Therefore, it is possible to reduce the size of the entire image sensor module.

The image sensor 33 is formed to have the substantially same width as the FPCB 31 and is attached on the lower surface of the FPCB 31. The image sensor 33 includes a light receiving section (pixel area) which receives light from a condensing lens of the lens section 10 so as to perform photoelectric conversion and a signal processing section (ISP) which transmits a signal, generated by the receiving section, as image data.

On the surface of the image sensor 33 which is attached to one surface of the FPCB 31, a plurality of electrode pads (not shown) are formed. On the electrodes pads, bumps are formed. In this case, when the image sensor 33 is attached by a flip-chip bonding method for COF packaging, the bumps projecting on the electrode pads and an anisotropic conductive film (ACF), a non-conductive paste (NCP), or a non-conductive film (NCF) can be used. The bump is composed of any one of a stud-type bump, a non-electrolytic bump, and an electrolytic bump. When a stud-type bump is used, the height of the bump can be reduced at the time of flip-chip pressing such that the step between ceramic leads can be improved. Therefore, the stud-type bump is advantageous in terms of the enhancement of reliability of a product.

The thickness of the image sensor, which can be applied to the present invention, is not limited. However, it is preferable to use an ultra-slim image sensor having a thickness of less than about 200 μm.

The impact absorbing member 50 attached on the surface (upper surface) opposite to the FPCB surface (lower surface), on which the image sensor is attached, serves to absorb or buffer an external impact and serves as a coupling guide by which the side surface of the impact absorbing member 50 is coupled to the inner periphery of the housing while coming in contact with the inner periphery. That is, the side surface of the impact absorbing member 50 and the inner periphery of the housing form a connecting interface, as shown in FIGS. 3A and 3B. Therefore, when an external impact is generated at a falling test or the like, the impact absorbing member 50 directly absorbs or buffers the impact so as to protect the ultra-slim image sensor from the external impact.

The impact absorbing member 50 can be formed of ceramic, synthetic resin such nylon or polycarbonate, and metal.

When the impact absorbing member 50 is formed of synthetic resin, the board or housing to be bonded thereto by an adhesive is formed of the same material, thereby strengthening a bonding force. Further, when the impact absorbing member 50 is formed of a metallic material, the impact absorbing member 50 can serve as a heat sink and can have a high strength. Particularly, it is preferable that the impact absorbing member 50 is formed of ceramic. This is because, since the impact absorbing member 50 is manufactured by a dicing process, precision errors or burs can be prevented from occurring, compared with when the impact absorbing member 50 is formed of synthetic resin or metallic materials.

Preferably, the outer periphery of the impact absorbing member 50 is formed to have a shape and size corresponding to the inner periphery of the lower opening of the housing, in order to serve as a coupling guide when the impact absorbing member 50 is coupled to the housing. Accordingly, the image sensor module and the housing can be more securely coupled to each other. Naturally, the impact absorbing member 50 should be provided with such a space that can transmit light into the image sensor through the central portion thereof.

As shown in FIG. 5B, the impact absorbing member 50 has a cavity 52 formed on the upper surface thereof, in which an IR-cut filter can be received and attached. The cavity 52 is formed so as to secure a lens focal distance for a high-pixel mobile terminal which is recently developed.

When a double-side FPCB is used as the FPCB 31 as described above, and when passive elements are mounted on the upper surface (the inward direction of the housing) of the double-side FPCB, the impact absorbing member 50 has spaces 51 which are perforated in positions corresponding to the passive elements. Owing to the shape of the spaces 51, at least one ore more electrical parts 34 can be mounted so as to be included in the housing, which makes it possible to reduce the size of the entire image sensor module.

The electrical parts 34 which can be mounted on the image sensor module 30 include at least one or more multilayer ceramic capacitors (MLCC). In addition, the electrical parts 34 can additionally include other parts such as resistors, diodes, transistors and the like. Here, the MLCC serves to remove screen noise occurring in a camera module. Other electrical parts can be used for enhancing a quality.

As shown in FIG. 6, the impact absorbing member 50 is formed to have a larger outer circumference than or the same outer circumference as the image sensor.

When the outer circumference of the impact absorbing member 50 is larger than that of the image sensor as shown in FIG. 6, the image sensor does not come in contact with the housing when being coupled to the housing. Therefore, an external impact applied to the housing cannot be transmitted to the image sensor so as to protect the ultra-slim image sensor.

When the outer circumference of the impact absorbing member 50 is the same as that of the image sensor, an image sensor module can be manufactured to have a size corresponding to the size of the image sensor, which makes it possible to manufacture a chip-scale sized package. In this case, the outer periphery of the image sensor also serves as a coupling guide when image sensor is coupled to the housing. Therefore, it is possible to prevent tilting and rotating of an optical axis which can occur when packaging is performed.

In order to protect a light receiving surface of the image sensor from the external environment, a sealing material is filled between the housing and the image sensor bonded to the circuit board.

Meanwhile, the IR-cut filter is mounted inside the housing or is formed to have a size and shape corresponding to the window formed in the circuit board so as to be directly bonded on the upper surface of the circuit board.

The IR-cut filter can be attached on the upper surface of the impact absorbing member 50. In this case, the IR-cut filter can be received and attached on the inside of the cavity 52 formed on the upper surface of the impact absorbing member 50. Such a cavity 52 allows a lens focal distance to be secured, even though a lens focal distance tends to be reduced in a high-pixel mobile terminal and the impact absorbing member 50 is provided.

As such, the IR-cut filter of the present invention does not serve as a coupling guide any more, when being coupled to the housing. Therefore, a degree of freedom in design with respect to the filter disposition increases.

Method of Manufacturing Camera Module Package

Hereinafter, a method of manufacturing a camera module package according to the present invention will be described with reference to FIG. 7. FIGS. 7A to 7D are sectional views illustrating a process of manufacturing the camera module package according to the invention.

As shown in FIGS. 7A to 7D, the method of manufacturing a camera module package is roughly divided into the steps of attaching an image sensor and electrical parts on an FPCB, attaching an impact absorbing member 50 on the FPCB having the image sensor attached thereon, coupling an image sensor module having the impact absorbing member 50 attached thereon to a housing, and sealing a coupled body of the image sensor module and the housing.

First, a unit image sensor 33 having a predetermined size is prepared by cutting an image sensor wafer, as shown in FIG. 7A. In this case, the unit image sensor 33 is cut so that cutting tolerance is less than 20 μm in both width directions. After that, an FPCB 31 is prepared, having the substantially same width as the image sensor 33. The FPCB 31 has a window 32 formed to have such a size that light received from a condensing lens of a lens barrel 10 can pass. Then, the image sensor 33 and the rear surface of the FPCB 31 are attached by pressing, with an adhesive member interposed therebetween. The adhesive member can be selected from a group consisting of an anisotropic conductive film (ACF), a non-conductive film (NCF), and a non-conductive paste.

If an IR-cut filter for blocking infrared light from incident light passing through the lens section 10 is not mounted inside the housing 20, an IR-cut filter can be attached on the surface (upper surface) opposite to the rear surface of the FPCB 31 of the image sensor module 30, the IR-cut filter being formed to have such a size that can cover the window 32. Further, the IR-cut filter can be attached on the impact absorbing member 50 after the attaching of the impact absorbing member.

If a double-sided FPCB is used as the FPCB 31, a step of mounting at least one or more electrical parts 34 on the upper surface of the FPCB 31 of the image sensor module between the window 32 and the outer periphery of the image sensor can be added. As an example, the electrical parts 34 such as multilayer ceramic capacitors (MLCC) can be attached on the surface opposite to the rear surface of the FPCB 31 by the following method: solder cream is coated on predetermined portions of the MLCCs such that the MLCCs are attached by a hardening process. It is preferable to use solder cream in terms of a manufacturing cost.

As shown in FIG. 7B, the impact absorbing member 50 is attached on the FPCB 31 of the image sensor module 30. In this case, a recognition mark can be applied on the FPCB such that the impact absorbing member 50 is received in a right position.

As shown in FIG. 7C, the image sensor module 30 having the impact absorbing member 50 attached thereon and the housing 20 are coupled to each other. The coupling is performed with the outer periphery of the impact absorbing member 50 being set to a coupling guide.

As shown in FIG. 7D, a space between the housing 20 and the image sensor module 30 is sealed in a state where the housing 20 and the image sensor module 30 are coupled to each other.

In the step of sealing, paste-state sealing resin is preferably applied, as shown in FIG. 7D.

Meanwhile, when the image sensor module 30 and the housing 20 are assembled, the lens barrel 10 may be previously mounted, into which an aperture, a condensing lens and the like are previously assembled from the upper opening of the housing 20. Alternately, the lens barrel 10 may be mounted after the image sensor module 30 and the housing 20 are assembled.

According to the camera module package of the invention, the chip thickness of the image sensor can be reduced three times, compared with a conventional image sensor module according to a COF packaging method. Therefore, although the thickness of the entire module is reduced, an external impact can be reliably absorbed.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A camera module package comprising:
   a housing having a lens section mounted therein;
   a circuit board having a window through which light transmitted through the lens section of the housing passes;

an image sensor that is flip-chip bonded to a lower surface of the circuit board;

an impact absorbing member attached to an upper surface of the circuit board, of which the side surface serves as a coupling guide which is coupled to an inner periphery of the housing.

2. The camera module package according to claim 1, wherein the outer circumference of the impact absorbing member is larger than that of the image sensor.

3. The camera module package according to claim 1, wherein a sealing material is filled between the housing and the image sensor bonded to the circuit board.

4. The camera module package according to claim 1, wherein the outer circumference of the impact absorbing member has the same size as that of the image sensor.

5. The camera module package according to claim 1, wherein the bottom surface of the housing and the bottom surface of the image sensor bonded to the circuit board are formed at the same level.

6. The camera module package according to claim 1, wherein the bottom surface of the housing is formed to project downward more than the bottom surface of the image sensor bonded to the circuit board.

7. The camera module package according to claim 1, further comprising an IR-cut filter formed to have a size and shape corresponding to the window, the IR-cut filter being attached on the upper surface of the circuit board.

8. The camera module package according to claim 1, further comprising an IR-cut filter attached on the upper surface of the impact absorbing member.

9. The camera module package according to claim 1, further comprising an IR-cut filter formed to have a size and shape corresponding to the window, the IR-cut filter being attached on the lower surface of the housing.

10. The camera module package according to claim 8, wherein a cavity is formed on the upper surface of the impact absorbing member so as to receive the IR-cut filter, and the IR-cut filter is attached in the cavity.

11. The camera module package according to claim 1, wherein the circuit board is a double-sided FPCB, a passive element is mounted on an upper surface of the double-side FPCB, and the impact absorbing member has a space formed to correspond to the position of the passive element.

12. The camera module package according to claim 1, wherein the impact absorbing member is formed of ceramic materials.

13. The camera module package according to claim 1, wherein the impact absorbing member is formed of synthetic resin.

14. The camera module package according to claim 1 wherein the impact absorbing member is formed of metallic materials.

15. The camera module package according to claim 1, wherein the outer periphery of the impact absorbing member is formed to have a shape and size corresponding to the inner periphery of a lower opening of the housing, in order to serve as a coupling guide when the impact absorbing member is coupled to the housing.

16. The camera module package according to claim 1, wherein the image sensor has a thickness of less than 200 μm.

* * * * *

UNITED STATES PATENT AND TRADEMARK OFFICE
CERTIFICATE OF CORRECTION

PATENT NO. : 7,664,390 B2  Page 1 of 1
APPLICATION NO. : 11/606342
DATED : February 16, 2010
INVENTOR(S) : Jae Sub Cho et al.

It is certified that error appears in the above-identified patent and that said Letters Patent is hereby corrected as shown below:

Column 10, Line 22, change "claim 1" to --claim 1,--.

Signed and Sealed this

First Day of June, 2010

David J. Kappos
*Director of the United States Patent and Trademark Office*